(12) United States Patent
Dickerman (10) Patent No.: US 11,255,948 B1
(45) Date of Patent: Feb. 22, 2022

(54) DETERMINING FREQUENCY SPECTRA AND POLARITY OF FREQUENCY FOR IMBALANCED QUADRATURE SIGNALS INCLUDING FOR DOPPLER SYSTEM TARGET SPEED AND DIRECTION

(71) Applicant: Robert Dickerman, Northfield, MA (US)

(72) Inventor: Robert Dickerman, Northfield, MA (US)

( * ) Notice: Subject to any disclaimer, the term of this patent is extended or adjusted under 35 U.S.C. 154(b) by 459 days.

(21) Appl. No.: 16/435,469

(22) Filed: Jun. 8, 2019

(51) Int. Cl.
*G01S 7/35* (2006.01)
*G01S 7/53* (2006.01)
*G01S 7/48* (2006.01)

(52) U.S. Cl.
CPC ............ *G01S 7/352* (2013.01); *G01S 7/4808* (2013.01); *G01S 7/53* (2013.01); *G01S 7/358* (2021.05)

(58) Field of Classification Search
CPC ........... G01S 7/352; G01S 7/4808; G01S 7/53
See application file for complete search history.

(56) References Cited

U.S. PATENT DOCUMENTS

| | | | | |
|---|---|---|---|---|
| 4,031,462 A | * | 6/1977 | Bouvier | G01R 23/16 324/76.22 |
| 8,343,055 B2 | * | 1/2013 | Kunita | G01S 7/52031 600/457 |

OTHER PUBLICATIONS

Rubin, Johnathan M., Spectral Doppler US, [online], Oct. 11, 1993, [retrieved on Sep. 5, 2019], RadioGraphics 1994:14:139-150. Retrieved from the Internet <URL: https://pubs.rsna.org/doi/pdf/10.1148/radiographics.14.1 8128046>.

* cited by examiner

*Primary Examiner* — Bryan Bui (57) ABSTRACT

Devices and methods are provided for determining frequency spectra, as well as the polarity of frequency, of energy in quadrature signals. In Doppler detection systems, found in sonar, radar, lidar, optical velocimeters using interferometers, and ultrasonics applications, for example, this information can be used to determine target speed and direction. Embodiments obtain a quadrature signal and determine a sine transform of a cross correlation between the I and Q components of the quadrature signal, and can provide an output comprising a signed frequency spectrum. A sign of a sample of the signed frequency spectrum can correspond to a polarity of frequency. The signed frequency spectrum can be rapidly determined over a unipolar frequency span that may be only approximately half the baseband sampling frequency. The signed frequency spectrum may be impervious to imaging under severe conditions of uncorrected quadrature amplitude imbalance.

20 Claims, 5 Drawing Sheets

FIG. 5B

US 11,255,948 B1

DETERMINING FREQUENCY SPECTRA AND POLARITY OF FREQUENCY FOR IMBALANCED QUADRATURE SIGNALS INCLUDING FOR DOPPLER SYSTEM TARGET SPEED AND DIRECTION

TECHNICAL FIELD

The present disclosure relates to the determination of frequency spectra and polarity of frequency for quadrature signals in electronic and optical systems.

BACKGROUND

A quadrature signal is a complex signal with two components, one of which may interpreted as a real component, and the other of which may be interpreted as an imaginary component. By convention, the two components are named I, for in phase signal, and Q, for quadrature phase signal, respectively. These components may be generated from a single real signal by phase-shifted mixing or sampling. Quadrature signal processing and sampling are widely employed in many fields, including precision metrology, optical interferometers and optical velocimetry, detection and ranging systems such as radar, sonar, and lidar, ultrasonic bioinstrumentation, and communications technology. The use of quadrature signal processing may produce many system advantages, including reduced system cost, size, and weight, and increased flexibility of function. In radar and sonar systems, for example, quadrature signals allow determination of amplitude and polarity of Doppler frequency shift which, together with other information, can be used to determine the speed and direction (that is, away from, or towards, the observer) of motion of the target. In some systems, the target may be a reflecting or scattering entity comprising a plurality of objects, sometimes suspended in a gel, a liquid, or a gas. In communications systems, for example, multiple modulation modes may be implemented in the same hardware by varying the manner of baseband signal processing, when quadrature sampling is used.

Nonetheless, prior-art signal processors for quadrature signals suffer from certain disadvantages. For example, a conventional signal processor can determine spectra of a quadrature signal, as follows. Samples of the quadrature signal I, Q components are collected and interpreted as the real and complex components, respectively, of complex numbers. The complex numbers are arranged in chronological order, into complex number records. Fourier transforms of the complex number records are then performed, typically over a bipolar frequency range. Finally, magnitudes of the Fourier transform samples are generated. An ideal prior art system implementing these operations will separate indications of signal energy with positive and negative frequencies explicitly, with signal energy having positive frequency being manifested as spectral peaks or indications at positive frequencies, and signal energy having negative frequency being manifested as spectral peaks or indications at negative frequencies.

However, real world quadrature signals invariably suffer from at least some amplitude error and phase error, introduced during signal generation, propagation, or acquisition, that act to reduce system performance. In many radar, sonar, ultrasonic, and radio systems, for example, the I and Q signals may be generated by a pair of mixers whose local oscillators are phase-shifted by 90.0°. Alternatively, if sampling is used, samplers whose sample clocks are phase-shifted by 90.0°, together with lowpass filtering for analog systems or decimation for digital systems, may be employed to generate the I and Q signals. If the processing gains in the I and Q signal paths of such quadrature signal generators are not identical, the resulting I and Q signals are said to have amplitude imbalance. If the sampling phase for the I and Q signals is not exactly 90.0°, they are said to have phase imbalance. These errors are collectively termed quadrature signal imbalance. Some degree of quadrature signal imbalance arises naturally in all practical applications.

At a system level, such quadrature signal imbalance may be manifested as unwanted spectral images, distortion, and increased bit error rates, for example, in conventional systems.

Furthermore, the spectral transform performed in conventional systems typically requires complex number multiply and accumulates (MACs) at each frequency in the transform. Such complex number operations can be computationally intensive.

BRIEF DESCRIPTIONS OF THE DRAWINGS

Various embodiments in accordance with the present disclosure will be described with reference to the drawings, in which.

REFERENCE NUMERALS

110 I signal bus
112 Q signal bus
114 analyzer device
116 output bus
210 input registers
212 controller
214 memory device
216 arithmetic logic unit
218 output registers
310 assemble record block
312 cross correlation block
314 sine transform block
316 output block
410 −100 Hz peak
412 +250 Hz peak
414 −250 Hz image peak
416 +100 Hz image peak
510 100 Hz peak
512 250 Hz peak
514 broadened 100 Hz peak
516 broadened 250 Hz peak

DETAILED DESCRIPTION

Conventional signal processing to determine spectra and polarity of frequency of quadrature signals can suffer from spectral images and other errors caused by quadrature signal imbalance, and may be computationally intensive. The embodiments overcome these disadvantages by determining a sine transform of a cross correlation between the I and Q components of a quadrature signal.

Figure 1:
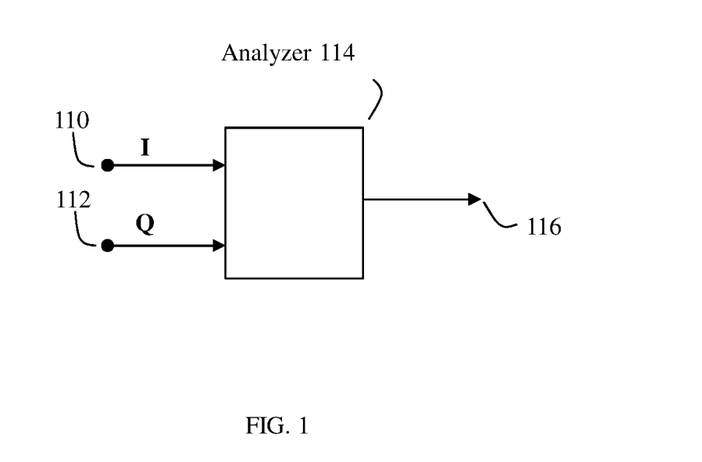
FIG. 1 shows an analyzer device in accordance with an embodiment.

Referring to FIG. 1, an analyzer device 114 is shown. Analyzer device 114 is an example of a computing system comprising a computing device processor and a memory device. In certain embodiments, analyzer device 114 may further comprise, for example, a controller, a memory, an arithmetic logic unit, and input and output registers that can be used to perform the operations described below. Analyzer device 114 may comprise inputs I signal bus 110 and Q signal bus 112 that, in certain embodiments, can be coupled to a quadrature signal comprising digital sample values of an I signal and a Q signal, respectively. The coupling may comprise wired, wireless, or optical coupling, for example. The I, Q signals referred to here are generally understood to be baseband signals. If the system that produced the quadrature signal is a Doppler sonar or radar system, for example, the frequency of the wave energy reflected from a target may be much higher than the Doppler shift, for example, a radio frequency (r.f.) or an intermediate frequency (i.f.). However, in such systems, a baseband quadrature signal having the Doppler shift frequencies can be generated by conventional mixing or sampling, for example, as mentioned above, and coupled to busses 110, 112. Busses 110, 112 may be serial or parallel busses. Analyzer device 114 can include an output bus 116. Output bus 116 may be a serial or parallel bus, and can couple an output comprising a signed frequency spectrum of the input I, Q signals to an external system or output device. The coupling may comprise wired, wireless, or optical coupling, for example.

A brief description of the operation of analyzer device 114 is as follows. Analyzer device 114 first obtains a representation of a quadrature signal comprising samples of an I signal and a Q signal that, in accordance with certain embodiments, can be coupled to I signal bus 110 and Q signal bus 112, respectively. Analyzer device 114 determines a cross correlation function between samples of the I signal and the Q signal, and determines a sine transform function of the cross correlation function. The sine transform function of the cross correlation function is a signed frequency spectrum. Samples of this signed frequency spectrum can be coupled to the output bus 116 of analyzer device 114. The sign of the value of the signed frequency spectrum at any frequency can be interpreted as the polarity of that frequency.

If the quadrature signal was generated by a Doppler detection system, the signed frequency spectrum may contain information about the speed and direction of a detected object, at least. Here, a spectral peak or indication at a frequency may be interpreted as an indication of a detected moving object, the moving object having caused a reflected wave with energy having that Doppler frequency shift. The absolute value of frequency shift can be approximately proportional to the object's speed, and so can be used, together with other information, to estimate the object's speed. The amplitude of the spectral sample may be interpreted as a measure of the received signal strength or energy. The sign of the value of the spectral sample at that frequency can be interpreted as the polarity of frequency, or polarity of the Doppler shift, or the polarity of the object speed; alternatively, the sign may be reversed, if desired, in certain embodiments. In either case, the sign of the value of the spectral sample will be opposite for objects moving in opposite directions (that is, substantially away from, or towards, the Doppler detection system).

In other words, indications from objects moving in opposite directions are not separated and displayed as a peak at a negative frequency for one direction, and a peak at a positive frequency for the other direction. Rather, all spectral peaks or indications can be displayed over the same positive frequency axis, and the sign of the value of a spectral peak or indication represents the polarity of the object direction. Examples of this will be shown below. Alternately, all spectral peaks or indications can be displayed over a negative frequency axis; again, the sign of the value of a spectral peak or indication will represent the polarity of the object direction.

The spectra generated by the embodiments can be used in many different ways, as is known to those skilled in the art. For example, the spectral data generated by the embodiments may be rearranged in a conventional manner to make graphs that are familiar to users of ultrasonic bioinstrumentation such as pulsed wave (PW) Doppler or continuous wave (CW) Doppler ultrasonic bioinstrumentation. This can be done, for example, by displaying each spectrum's samples as dots on a graph. Each dot's vertical displacement from a horizontal baseline on the graph can be proportional to the frequency of its corresponding spectral sample. Each dot's brightness or color can be a function of the amplitude of the spectral sample. Spectral samples with positive frequencies can be plotted above the baseline, and can represent motion in one direction, and spectral samples with negative frequencies can be plotted below the baseline, and can represent motion in the opposite direction. Subsequent, successive spectral data can be plotted from left to right or from right to left, so that time is represented on the horizontal axis of the graph.

The embodiments have the advantageous aspect that imbalance in the quadrature signal will substantially not cause spectral images in the embodiments' output spectra. Furthermore, even severe amplitude imbalance causes no distortion, and significant phase imbalance produces only minor distortion, in the shape of the embodiments' output spectra. Finally, the embodiments can have reduced cost, size and weight, as well as longer battery life. This will all be explained in greater detail below.

Figure 2:
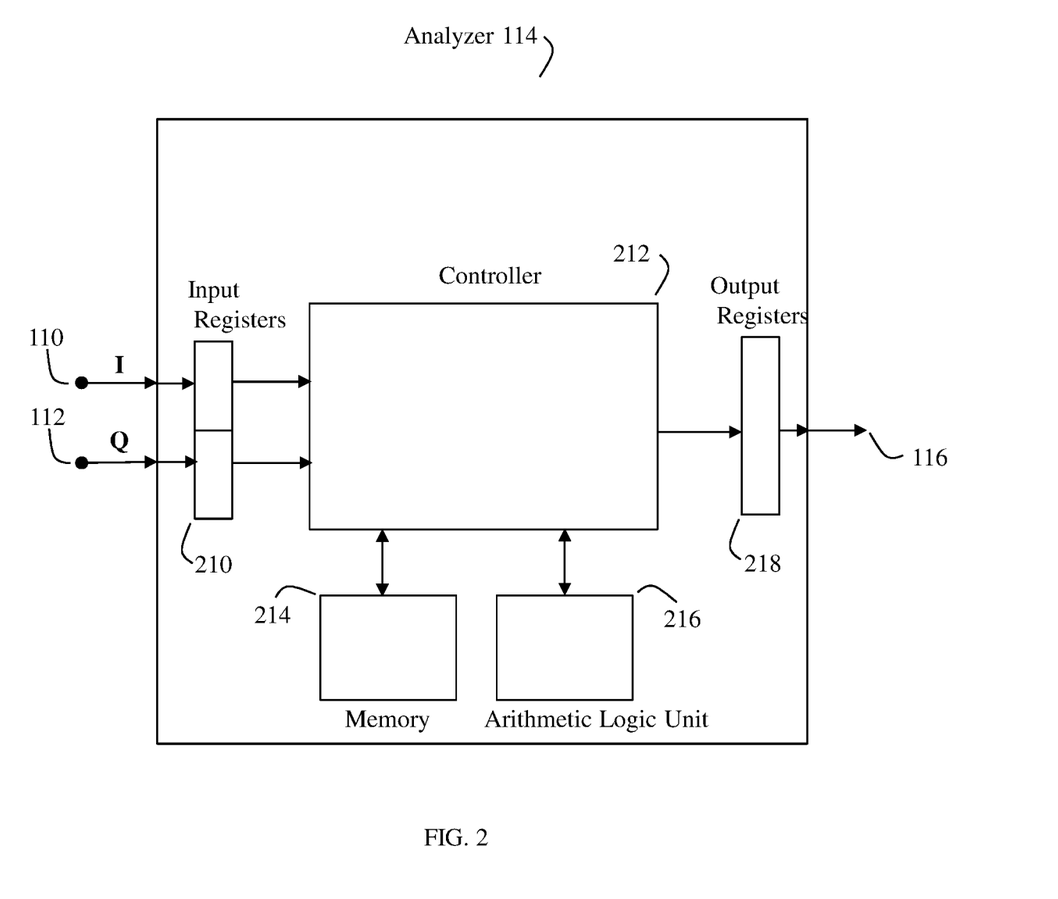
FIG. 2 illustrates an example embodiment of the analyzer device in FIG. 1.

Referring to FIG. 2, an example analyzer device 114 is shown. Analyzer device 114 may comprise input registers 210 for storing records of I and Q signals, a controller 212 for performing sequencing of operations, executing control functions, and, in accordance with certain embodiments, reading and writing program and data information from and to memory, a memory 214 for storing constants, data, and program instructions, an arithmetic logic unit 216 for performing mathematical operations including cross correlation and sine transform techniques, and output registers 218 for storing output results. The diagram of FIG. 2 is provided as just one example of a detailed implementation of analyzer device 114; many different variations of interconnections and components are possible, as will be apparent to a skilled practitioner. The devices of FIGS. 1 and 2 can comprise various types and combinations of hardware and software, such as one or more of a general purpose computer, a digital signal processor (DSP), a field programmable gate array (FPGA), digital circuitry, or an application specific integrated circuit, in certain embodiments further comprising a memory device including instructions that, when executed by the computing device processor, cause the hardware to perform the operations of the embodiments. Alternatively, in accordance with certain embodiments, hardware can be configured or hard-wired to equivalently perform the operations of the embodiments by using hardware state machines, without actually fetching and executing software instructions from a memory device. Configuring may be permanent (one time), or may need to be repeated each time the hardware is powered.

Figure 3:
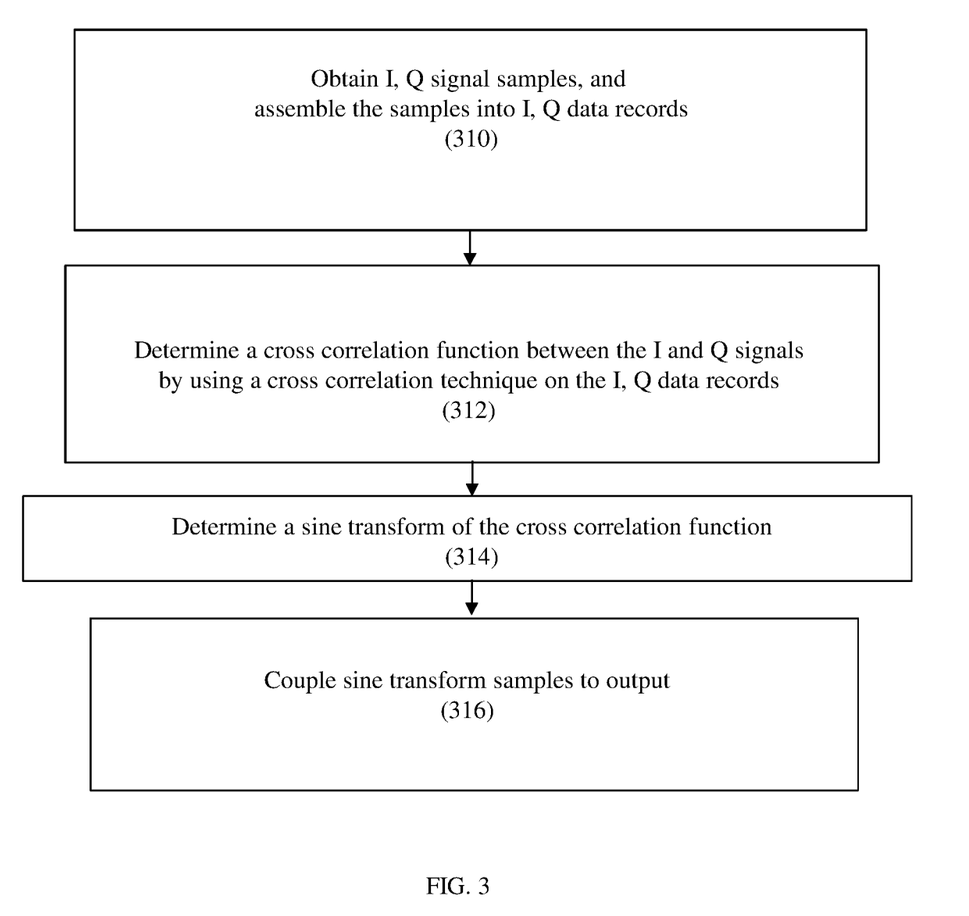
FIG. 3 is a flow chart for operations of an embodiment of the analyzer device of FIG. 1 in accordance with various embodiments.

Referring to FIG. 3, a flow chart for the operations of an embodiment of analyzer device 114 is shown.

In assemble record block 310, analyzer device 114 determines a plurality of samples of the quadrature signal, a first sample of the plurality of samples associated with first in-phase data (associated with an I signal), and first quadrature phase data (associated with a Q signal), a second sample of the plurality of samples associated with second in-phase data and second quadrature phase data; and combines at least the first and second samples to generate a representation of the quadrature signal. In certain embodiments the I and Q signals are coupled to I signal bus 110 and Q signal bus 112, respectively, and are treated as a pair of real-valued signals (versus being combined into a single complex-valued signal as they were for the prior art devices mentioned above). In other words, samples of I, Q comprising in-phase data and quadrature phase data are obtained and collected into an I record and a Q record, respectively, in certain embodiments using input registers, controller, memory, and arithmetic logic unit of analyzer device 114. In certain embodiments these records can be stored in input registers of analyzer device 114. Alternatively, these records may be determined in memory of analyzer device 114.

In cross correlation block 312, a cross correlation can be determined between the I and Q records using a cross correlation technique, in certain embodiments using input registers, controller, memory, and arithmetic logic unit of analyzer device 114. The resulting cross correlation function, which can be real-valued, can be stored, in certain embodiments, in a memory of analyzer device 114.

A specific discrete-time example of the mathematical operation performed by cross correlation block 312 (used in a Mathcad simulation of this embodiment) is $$G_{AB_j} := \sum_{i=0}^{(n-1)-j} A_i \cdot B_{(j+i)}$$

wherein $G_{AB}$ is a cross correlation function of signals A and B (here A and B are the I record and the Q record, respectively), j is the index number of a sample in $G_{AB}$, n is the number of samples in a time record, and i is a dummy index variable ranging from 0 to ((n−1)−j).

In sine transform block 314, a sine transform of cross correlation function $G_{AB}$ can be determined using a Fourier sine transform technique, and using in certain embodiments a controller, memory, and arithmetic logic unit of analyzer device 114.

A specific discrete-time example of the mathematical operation performed by sine transform block 314 (used in a Mathcad simulation of this embodiment) is $$Fsine_k := \sum_{j=0}^{(n-1)} G_{AB}(j) \cdot \sin\left(2 \cdot \pi \cdot \frac{k}{n} \cdot j\right)$$

wherein Fsine is the sine transform of cross correlation function $G_{AB}$, k is the index number of a sample in Fsine (k may be interpreted as frequency), n is the number of samples in $G_{AB}$, as well as the number of samples in the resulting signed frequency spectrum, and j is an dummy index variable ranging from 0 to (n−1). Each $k^{th}$ element (in other words, each $k^{th}$ sample) of the n elements of Fsine is a signed real number.

Those skilled in the art will recognize that the resulting function Fsine, as defined above, is a signed frequency spectrum that can be closely related to the quadrature spectral density function or quadspectrum. The quadspectrum is the imaginary component of the Fourier transform of the cross correlation of I, Q, or, equivalently, the imaginary component of the cross-spectral density function of I, Q. However, use of the quadspectrum may cause an unintended sign reversal in Fsine spectral values, because of the (−) sign in the complex exponent used in the definitions of the Fourier transform and the cross-spectral density function.

In output block 316, at least one of the n elements of Fsine (Fsine comprising the signed frequency spectrum, or output spectrum) can be coupled to an output—in certain embodiments, onto output bus 116 of analyzer device 114. Alternatively, in certain embodiments, at least one of the n elements of Fsine can be determined in output registers of analyzer device 114, or in yet another alternative, determined in a memory of analyzer device 114.

Figure 4A:
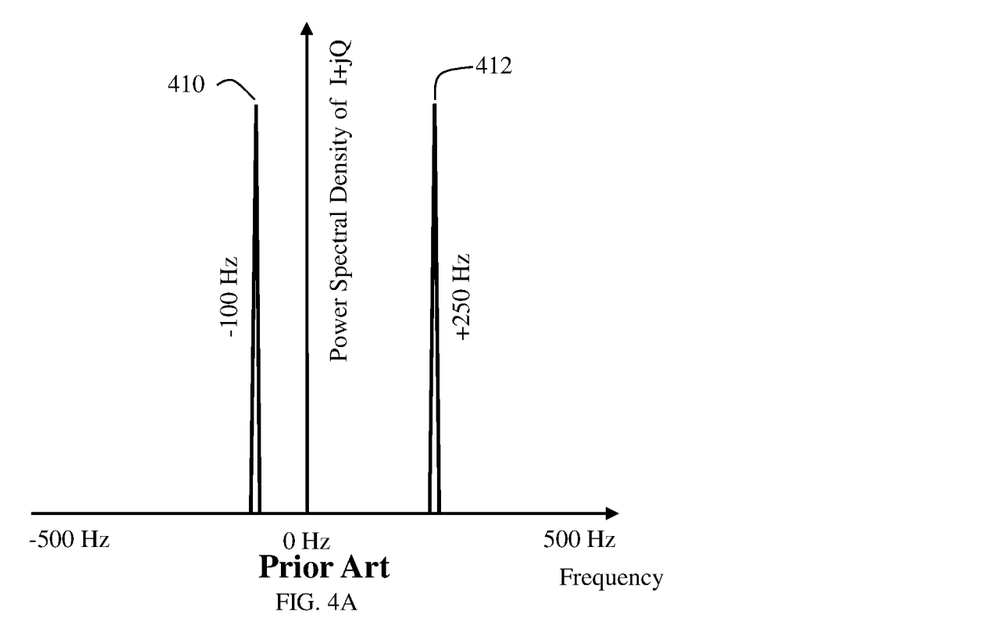
FIG. 4A is a graph of power spectral density of a simulated quadrature signal with 0 imbalance in accordance with a prior art device.
Figure 4B:
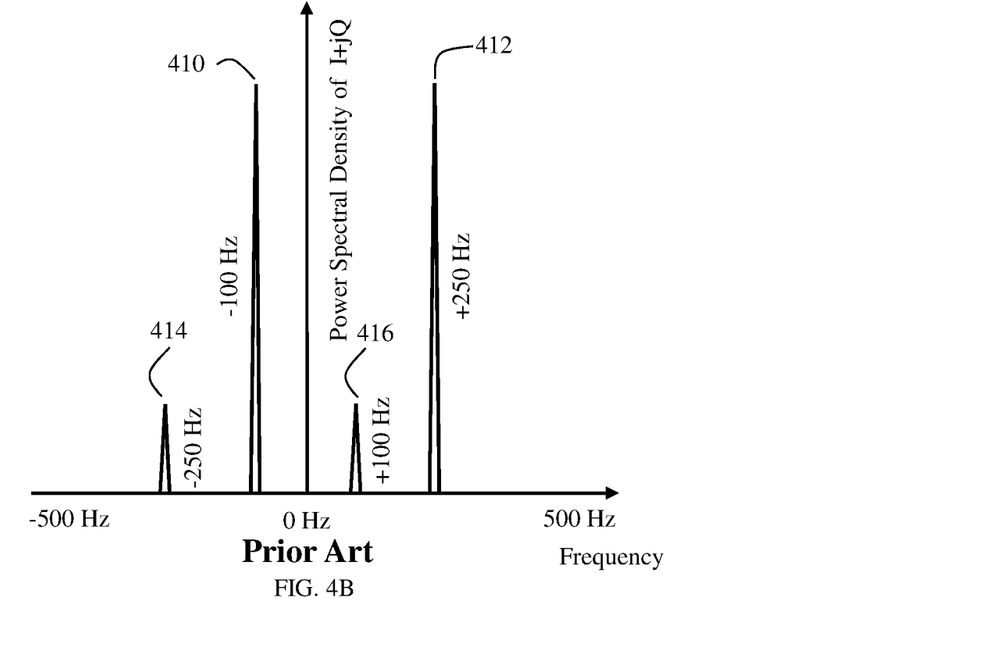
FIG. 4B is a graph of power spectral density of a simulated quadrature signal with moderate imbalance in accordance with a prior art device.

FIGS. 4A and 4B represent spectra generated by a conventional device in accordance with the prior art method described above in the Background section. FIG. 4A illustrates a power spectral density function generated by a conventional device for an example balanced quadrature signal (in other words, the example balanced quadrature signal is perfectly balanced, and has 0 imbalance). The example balanced quadrature signal for which the power spectral density was generated has two frequency components of equal amplitude, having baseband frequencies (for example, after image-rejecting direct conversion in a radar system) of 100 Hz and 250 Hz. The I, Q sinusoids are of nominally equal amplitude, the magnitude of the I, Q vector sum is equal to the magnitude of the baseband quadrature signal, and the I, Q sinusoids have a nominal 90.0° phase difference between them. The I, Q signal components corresponding to the 100 Hz baseband component are 100 Hz sinusoids. The I, Q signal components corresponding to the 250 Hz baseband component are similar; however, while, for the 100 Hz component, the Q signal is phase shifted from that of the I signal by nominally +90.0°, for the 250 Hz component, the Q signal is phase shifted by nominally −90.0°. These (opposite polarity) phase shifts of I vs. Q for the two different frequencies are characteristic of quadrature signal components that might be expected in a radar or sonar system, for example, when measuring the speeds of two targets moving at different speeds in opposing directions (with respect to the system).

Again, FIG. 4A represents a spectrum generated by a conventional device of the balanced quadrature signal described above, for the frequency range −500 Hz to +500 Hz. In this example the spectrum has two spectral peaks, a −100 Hz peak 410, and a +250 Hz peak 412. As mentioned above, the signs of the frequencies correspond to positive and negative phase shifts between the 100 Hz and 250 Hz components, respectively. The negative and positive frequencies may ultimately be interpreted as corresponding to negative and positive target motion directions, or, equivalently, negative and positive polarities of target speeds.

Note that the spectrum of FIG. 4A, for quadrature signal analysis, is quite different from the spectrum that would be obtained by analyzing a real-valued signal, or just one of the I or Q component of a quadrature signal—such as, for example, just the I signal. The spectrum of just the I signal would include four equal-amplitude peaks mirrored about 0 Hz, at −250 Hz, −100 Hz, +100 Hz, and +250 Hz (not shown). No information regarding the directions of target motions could be gleaned from such a spectrum. Incidentally, such a spectrum (not shown) might also be interpreted as the results of quadrature signal analysis for a system with a worse-case quadrature imbalance (essentially missing one of the two quadrature components, I or Q) and having Image Rejection Ratio (IRR)=0 dB.

FIG. 4B is a graph of power spectral density generated by a conventional device of a simulated quadrature signal with moderate imbalance. Here, a moderate amount of uncorrected quadrature imbalance is present—that is, an amplitude imbalance of about 0.1=10.0%, and a phase imbalance of about 0.2 rad=11.5°. The desired peaks −100 Hz peak 410 and +250 Hz peak 412 are again present, as in FIG. 4A. However, in FIG. 4B, the moderate amount of quadrature imbalance causes significant additional, undesired peaks in the output of the prior art device, namely a −250 Hz image peak 414 and a +100 Hz image peak 416. It is an objective of the embodiments to provide output spectra that are not contaminated with such image peaks, but that, nonetheless, indicate polarity of frequency.

Figure 5A:
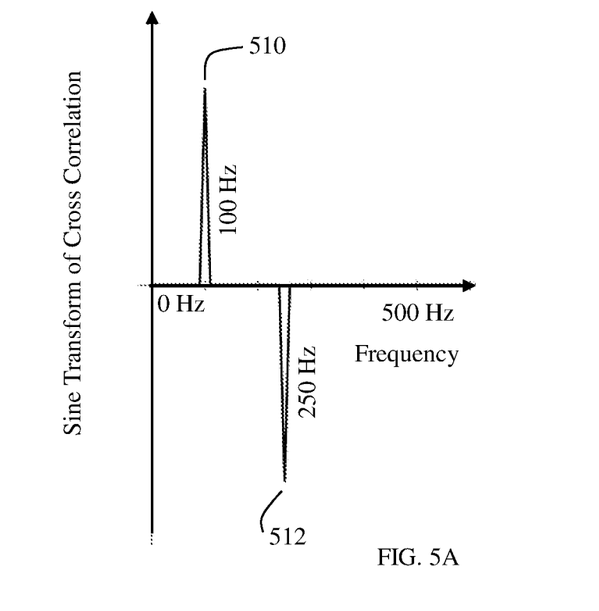
FIGS. 5A and 5B illustrate example graphs of output spectra in accordance with various embodiments.
Figure 5B:
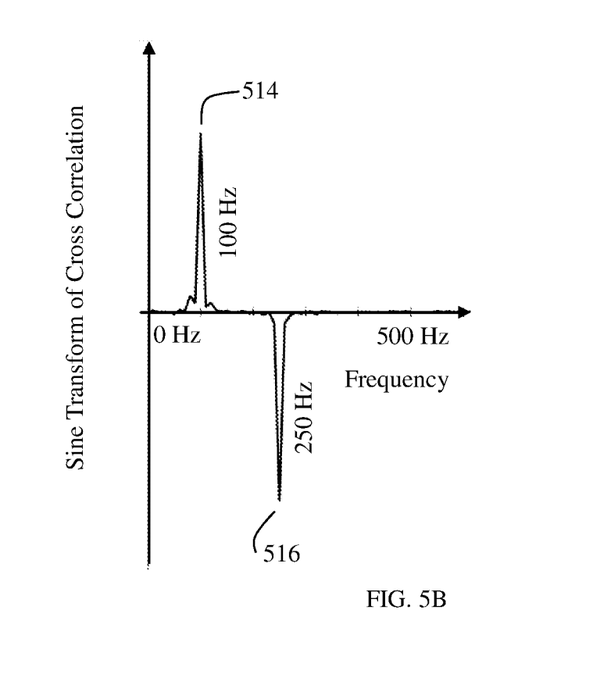

FIGS. 5A and 5B illustrate example graphs of output spectra in accordance with various embodiments.

In FIG. 5A, an example output spectrum for analyzer device 114 is shown. In this case, the input I, Q signals were similar to those corresponding to FIG. 4B, except that a much larger amplitude imbalance of about 0.5=50.0% was introduced, and phase imbalance was 0°.

In FIG. 5A, the 100 Hz component is manifested as a 100 Hz peak 510 with positive polarity, and the 250 Hz component is manifested as a 250 Hz peak 512 with negative polarity (corresponding to an opposite direction of object motion in a Doppler detection system, for example).

In other words, in accordance with various embodiments, positive-going sine transform peaks (such as 100 Hz peak 510) indicate objects moving in one direction, and negative-going sine transform peaks (such as 250 Hz peak 512) indicate objects moving in the opposite direction. All of these peaks can be displayed over a single side of the frequency axis; for example, in FIG. 5A, all peaks occur to the right of 0 Hz over just the positive frequency axis.

FIG. 5A demonstrates that the signed frequency spectrum generated by analyzer device 114 may be used to determine the amplitudes of object speeds as well as the directions of object motions in Dopper detection systems, for example.

Furthermore, no undesired image peaks are apparent in FIG. 5A, despite the relatively large amplitude imbalance (50.0%) in the quadrature signal. In fact, no artifacts of any sort are discernable. The only effect that amplitude imbalance has is that it scales the magnitude of the spectrum uniformly over frequency, without affecting the spectrum's shape; this does not hinder the determination of polarity of frequency of spectral peaks or indications. In this sense, the analyzer device 114 is substantially immune to amplitude imbalance in a quadrature signal.

FIG. 5B shows an example output spectrum of analyzer device 114 for a similar case to that of FIG. 5A, except that the input I, Q signals included added white gaussian noise (AWGN). The spectrum of FIG. 5B demonstrates that embodiment analyzer device 114 may be used to determine the amplitudes of object speeds and the polarities of object speeds in the presence of AWGN, in Dopper detection systems, for example.

Advantages

The embodiments have the advantageous aspect that quadrature imbalance does not cause spectral clutter in the form of additional, separate undesired spectral image peaks in their outputs, unlike for many prior art systems. The embodiments are substantially immune to amplitude imbalance in the quadrature signal. Furthermore, phase imbalances in the quadrature signal cause only minor distortions in the output spectra of the embodiments.

To elaborate, even a large amplitude imbalance in the quadrature signal will not degrade the output spectrum (the Fsine function described above) of various embodiments. For example, as can be seen in the simulation results of FIGS. 5A and 5B, a 1.5 amplitude ratio of the I signal to the Q signal (equivalent to a 50.0% amplitude imbalance), does not produce spectral images, or, indeed, any discernable change in the shape of the output spectrum. Indeed, the embodiments may not require any limit on amplitude imbalance. For example, even a spectrum generated from a quadrature signal with an uncorrected amplitude imbalance of up to approximately 1000 percent or 20 decibels may be substantially free of images. Rather, amplitude imbalance will only scale the magnitude of the spectrum uniformly over frequency, and this does not hinder substantially the determination of polarity of frequency of spectral peaks or indications.

Furthermore, significant phase imbalance in the quadrature signal will produce only minor effects in the output spectrum. For example, a relatively large 12.0 degree phase imbalance between the I signal and Q signal will cause only minor distortion in the shape of spectral peaks (not shown), and this does not hinder substantially the determination of polarity of frequency of spectral peaks or indications. Even a spectrum generated from a quadrature signal with a uncorrected phase imbalance of up to approximately 20 degrees will be substantially free of images.

In fact, the one-sided nature of the frequency spectra of the outputs of the embodiments, such as those shown in FIGS. 5A and 5B, substantially mitigates the possibility of the appearance of spectral images, since the display of such images generally requires a frequency span that is approximately equal to the sample rate of the incoming quadrature signal. In the example of the spectra of FIGS. 5A and 5B, that sample rate is 1000 Hz, and the frequency span displayed is only approximately half the sample rate, or 500 Hz. Hence, the embodiments inherently mitigate the appearance of spectral images in their output spectra, under conditions that would render most conventional systems unusable unless they (conventional systems) employ imbalance correction; but imbalance correction has its own disadvantages, discussed further below.

Another advantageous aspect of the embodiments is that they can perform fewer arithmetic operations that prior art devices, for several possible reasons. First, in sine transform block 314, the embodiments determine a sine transform, rather than the full complex Fourier transform performed in many conventional devices. Consequently, the embodiments can perform multiplications of real numbers only, which can require less MACs than the multiplications of complex numbers performed in full complex Fourier transforms. Second, since in various embodiments the signed frequency spectrum generated by sine transform block 314 may be determined for only approximately half the frequency span of certain prior art devices, the embodiments may require fewer operations to generate a spectrum than are required by conventional devices and methods; the number of arithmetic operations may be further reduced by a another factor of 2, compared to many conventional devices and methods. Third, since the embodiments can produce spectra that are substantially image-free even when the quadrature signal has substantial imbalance, it may not be necessary to employ any imbalance correction (as is used in many conventional systems) before generating spectra from an imbalanced quadrature signal; this may also reduce the number of mathematical operations required for a system to generate a useful spectrum.

All of these aspects may be beneficial for portable, miniature or low-cost systems, for at least two reasons. First, in some embodiments, they can allow the use of relatively lower gain accuracy and relatively lower phase accuracy electronic or optical components for the acquisition of the quadrature signal that is coupled to analyzer device 114. Second, these aspects can allow simpler signal processing in analyzer device 114 in some embodiments. Consequently, some systems that employ the embodiments can have reduced cost, size and weight, as well as longer battery life.

Finally, as mentioned above, it may not be necessary for the embodiments to employ any imbalance correction (as is used in many conventional systems) before generating spectra from an imbalanced quadrature signal, because the embodiments are substantially impervious to quadrature imbalance. Therefore, the embodiments may have a speed or bandwidth advantage in applications wherein the quadrature imbalance is rapidly changing. This is because most conventional devices and methods employed for imbalance correction require a finite settling time to estimate new correction parameters after a change in imbalance occurs, and can therefore be limited in their ability to track a rapidly changing quadrature imbalance. The embodiments are not necessarily burdened by such a settling time.

SUMMARY

Although the description above contains many specificities, these should not be construed as limiting the scope of the embodiments but as merely providing illustrations of some of several embodiments.

For example, some descriptions provided herein of example embodiments reference sampled-data aspects, such as discrete-time and discrete-amplitude sampling. These were provided as examples, but do not preclude the implementation of the embodiments in analog or continuous-time or continuous-amplitude methods or devices.

Various other configurations may also be used, with particular elements that are depicted as being implemented in hardware instead being implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Embodiments can utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, a non-transitory computer readable storage medium, or any other medium which can be used to store the desired information and which can be accessed by a system device. Based on the disclosure and teachings provided herein, a person of ordinary skill in the art will appreciate other ways and/or methods to implement the various embodiments.

Thus, the scope of the embodiments should be determined by the appended claims and their legal equivalents, rather than by the examples given.

I claim:

1. A computing system, comprising:
a computing device processor;
a memory device including instructions that, when executed by the computing device processor, enables the computing system to:
obtain a quadrature signal through a coupling to a quadrature signal producing system;
determine a plurality of samples of the quadrature signal, a first sample of the plurality of samples associated with first in-phase data and first quadrature phase data, a second sample of the plurality of samples associated with second in-phase data and second quadrature phase data;
combine at least the first and second samples to generate a representation of the quadrature signal;
use a cross correlation technique on the representation of the quadrature signal to determine a cross correlation function between in-phase data and quadrature phase data; and
use a sine transform technique on the cross correlation function to generate a signed frequency spectrum;
whereby a frequency of a sample of the signed frequency spectrum can correspond to a frequency of an energy in the quadrature signal, and a sign of the sample of the signed frequency spectrum can correspond to a polarity of frequency or a polarity of phase of the energy.

2. The computing system of claim 1, wherein the sign of the sample of the signed frequency spectrum can correspond to a polarity of direction of a reflecting or scattering entity in a Doppler detection system.

3. The computing system of claim 1, wherein the frequency of the sample of the signed frequency spectrum is approximately proportional to a speed of a reflecting or scattering entity in a Doppler detection system.

4. The computing system of claim 1, wherein the signed frequency spectrum is generated over a frequency span that is approximately half of a sample rate for the plurality of samples of the quadrature signal,
whereby said signed frequency spectrum may be generated with fewer operations than are required by conventional systems.

5. The computing system of claim 1, wherein at least one sample of the signed frequency spectrum is coupled to an output selected from the group consisting of the memory device, a memory, output registers, an output bus, a storage device, a display device, a printer or a speaker.

6. The computing system of claim 1, wherein the computing system comprises a device selected from the group consisting of a general purpose computer, a digital signal processor, a field programmable gate array, digital circuitry, and an application specific integrated circuit.

7. The computing system of claim 1, wherein the quadrature signal has an uncorrected amplitude imbalance of up to approximately 1000 percent or 20 decibels,
whereby said signed frequency spectrum may nonetheless be substantially free of images.

8. The computing system of claim 1, wherein the quadrature signal has an uncorrected phase imbalance of up to approximately 20 degrees,
whereby said signed frequency spectrum may nonetheless be substantially free of images.

9. A method, comprising:
obtaining a quadrature signal through a coupling to a quadrature signal producing system;
determining a plurality of samples of the quadrature signal, a first sample of the plurality of samples associated with first in-phase data and first quadrature phase data, a second sample of the plurality of samples associated with second in-phase data and second quadrature phase data;
combining at least the first and second samples to generate a representation of the quadrature signal;
using a cross correlation technique on the representation of the quadrature signal to determine a cross correlation function between in-phase data and quadrature phase data; and
using a sine transform technique on the cross correlation function to generate a signed frequency spectrum;
whereby a frequency of a sample of the signed frequency spectrum can correspond to a frequency of an energy in the quadrature signal, and a sign of the sample of the signed frequency spectrum can correspond to a polarity of frequency or a polarity of phase of the energy.

10. The method of claim 9, wherein the sign of the sample of the signed frequency spectrum can correspond to a polarity of direction of a reflecting or scattering entity in a Doppler detection system.

11. The method of claim 9, wherein the frequency of the sample of the signed frequency spectrum is approximately proportional to a speed of a reflecting or scattering entity in a Doppler detection system.

12. The method of claim 9, wherein the signed frequency spectrum is generated over a frequency span that is approximately half of a sample rate for the plurality of samples of the quadrature signal,
whereby said signed frequency spectrum may be generated with fewer operations than are required by conventional systems.

13. The method of claim 9, wherein the quadrature signal has an uncorrected amplitude imbalance of up to approximately 1000 percent or 20 decibels,
whereby said signed frequency spectrum may nonetheless be substantially free of images.

14. The method of claim 9, wherein the quadrature signal has an uncorrected phase imbalance of up to approximately 20 degrees, whereby said signed frequency spectrum may nonetheless be substantially free of images.

15. A non-transitory computer readable storage medium storing instructions that, when executed by at least one processor of a computing system, causes the computing system to:

obtain a quadrature signal through a coupling to a quadrature signal producing system;

determine a plurality of samples of the quadrature signal, a first sample of the plurality of samples associated with first in-phase data and first quadrature phase data, a second sample of the plurality of samples associated with second in-phase data and second quadrature phase data;

combine at least the first and second samples to generate a representation of the quadrature signal;

use a cross correlation technique on the representation of the quadrature signal to determine a cross correlation function between in-phase data and quadrature phase data; and use a sine transform technique on the cross correlation function to generate a signed frequency spectrum;

whereby a frequency of a sample of the signed frequency spectrum can correspond to a frequency of an energy in the quadrature signal, and a sign of the sample of the signed frequency spectrum can correspond to a polarity of frequency or a polarity of phase of the energy.

16. The non-transitory computer readable storage medium of claim 15, wherein the sign of the sample of the signed frequency spectrum can correspond to a polarity of direction of a reflecting or scattering entity in a Doppler detection system.

17. The non-transitory computer readable storage medium of claim 15, wherein the frequency of the sample of the signed frequency spectrum is approximately proportional to a speed of a reflecting or scattering entity in a Doppler detection system.

18. The non-transitory computer readable storage medium of claim 15, wherein the signed frequency spectrum is generated over a frequency span that is approximately half of a sample rate for the plurality of samples of the quadrature signal, whereby said signed frequency spectrum may be generated with fewer operations than are required by conventional systems.

19. The non-transitory computer readable storage medium of claim 15, wherein the quadrature signal has an uncorrected amplitude imbalance of up to approximately 1000 percent or 20 decibels, whereby said signed frequency spectrum may nonetheless be substantially free of images.

20. The non-transitory computer readable storage medium of claim 15, wherein the quadrature signal has an uncorrected phase imbalance of up to approximately 20 degrees, whereby said signed frequency spectrum may nonetheless be substantially free of images.

* * * * *